Nov. 9, 1965     L. T. STEGMAIER     3,217,090
PANELBOARD

Filed Dec. 20, 1962                     2 Sheets-Sheet 1

INVENTOR.
Louis T. Stegmaier
BY Robert T. Casey
ATTORNEY

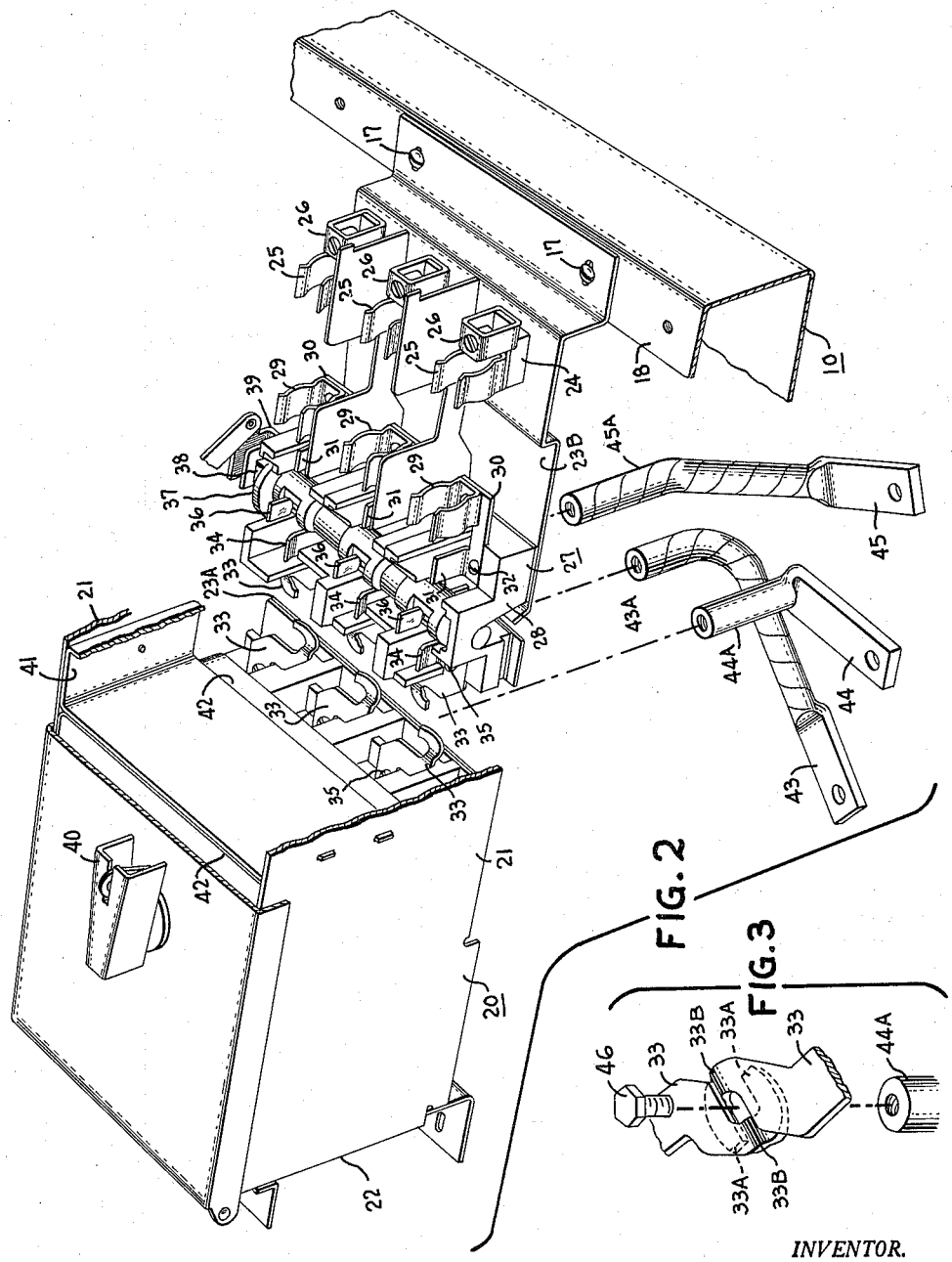

United States Patent Office 3,217,090
Patented Nov. 9, 1965

3,217,090
PANELBOARD
Louis T. Stegmaier, Plainville, Conn., assignor to General Electric Company, a corporation of New York
Filed Dec. 20, 1962, Ser. No. 246,229
6 Claims. (Cl. 174—72)

My invention relates to electrical panelboards, and more particularly to panelboards of the type including a plurality of box-like units each containing control mechanism and adapted to be mounted on a support, physically superimposed on and electrically connected to, a plurality of electrical bus bars, ordinarily three in number.

Electrical panelboards of the type described, according to the prior art, have included a primary support member carrying a plurality of bus bars, usually three in number. Each of the panelboard units comprising a box-like enclosure is physically mounted on the support, in transversely superimposed relation to the bus bars, by suitable means such as by screws. The control apparatus contained in the enclosures is connected to the three bus bars by branch connecting straps. The construction of the panelboard support and the units, according to the prior art, has required that branch connecting straps be connected from the units to the main bus bars from the back of the assembly.

It is an object of the present invention to provide a panelboard construction including panel units which can be connected to the main bus bars from the front of the panel during initial assembly.

It is an additional object of the invention to provide a panelboard construction in which panel units may be removed or disconnected from the main bus bars from the front of the assembly.

In accordance with a particular type of panelboard, three main bus bars are provided, and panelboard units are arranged in generally rectangular enclosures in pairs in end-to-end relation transversely of the bus bars and superimposed thereupon. In order to connect each of the panel units to each of the bus bars various branch connecting strap arrangements have been provided for such "double branch" units which are relatively expensive and difficult to install.

It is a further object of the present invention to provide a panelboard including units of the "double branch" type which can be easily connected to main bus bars by simple connecting means.

It is a general object of the invention to provide a panelboard construction which is simple, inexpensive, and easy to manufacture and assemble.

It is another general object of the invention to provide a panelboard of the "double branch" type wherein single connecting means may be used to make connections to each of the branch units and wherein identical connecting parts may be used for each of the branch connecting units.

In accordance with the invention in one form, an electrical panelboard is provided of the type described, comprising units which can be assembled and removed from the front of the panel, including a plurality of main bus bars supported on a primary support in side-by-side relation. A plurality of panel units are provided, each extending transversely of the main bus bars and arranged in a vertical row longitudinally thereof. Each such unit initially carries its own branch connecting straps at the back thereof for connection to respective bus bars. The branch connecting straps are arranged to project beyond the outline of the unit enclosure, so that when the enclosure is mounted on the main support, the ends of the branch connecting straps are accessible from the front for connection to the main bus bars. Each additional panel unit, when mounted overlies and therefore covers and protects the connections made between the branch connecting straps and the main bus bars of the previously mounted unit. Furthermore, in accordance with the invention, means is provided which is accessible when the cover of a particular unit is opened, to permit access to the connection between the panel unit and the other end of each of the branch connecting straps, whereby each unit may, if desired, be removed from the panelboard after initial assembly, without disturbing any other units.

In accordance with another aspect of the invention, a panelboard is provided including a double branch unit, each of the branches of which have a plurality of line connector terminals directed toward each other and including generally hook-shaped offset overlapping portions whereby connections may be made to both units by a single connecting screw.

The invention will be more fully understood from the following detailed description, and its scope will be pointed out in the appended claims.

In the drawings,

FIGURE 2 is a perspective view, partially broken away and partially exploded, showing a double branch unit of the invention and portions of the connecting straps therefore, and FIGURE 3 is an exploded perspective view of terminal connecting portions of the unit of FIGURE 2.

Figure 1:
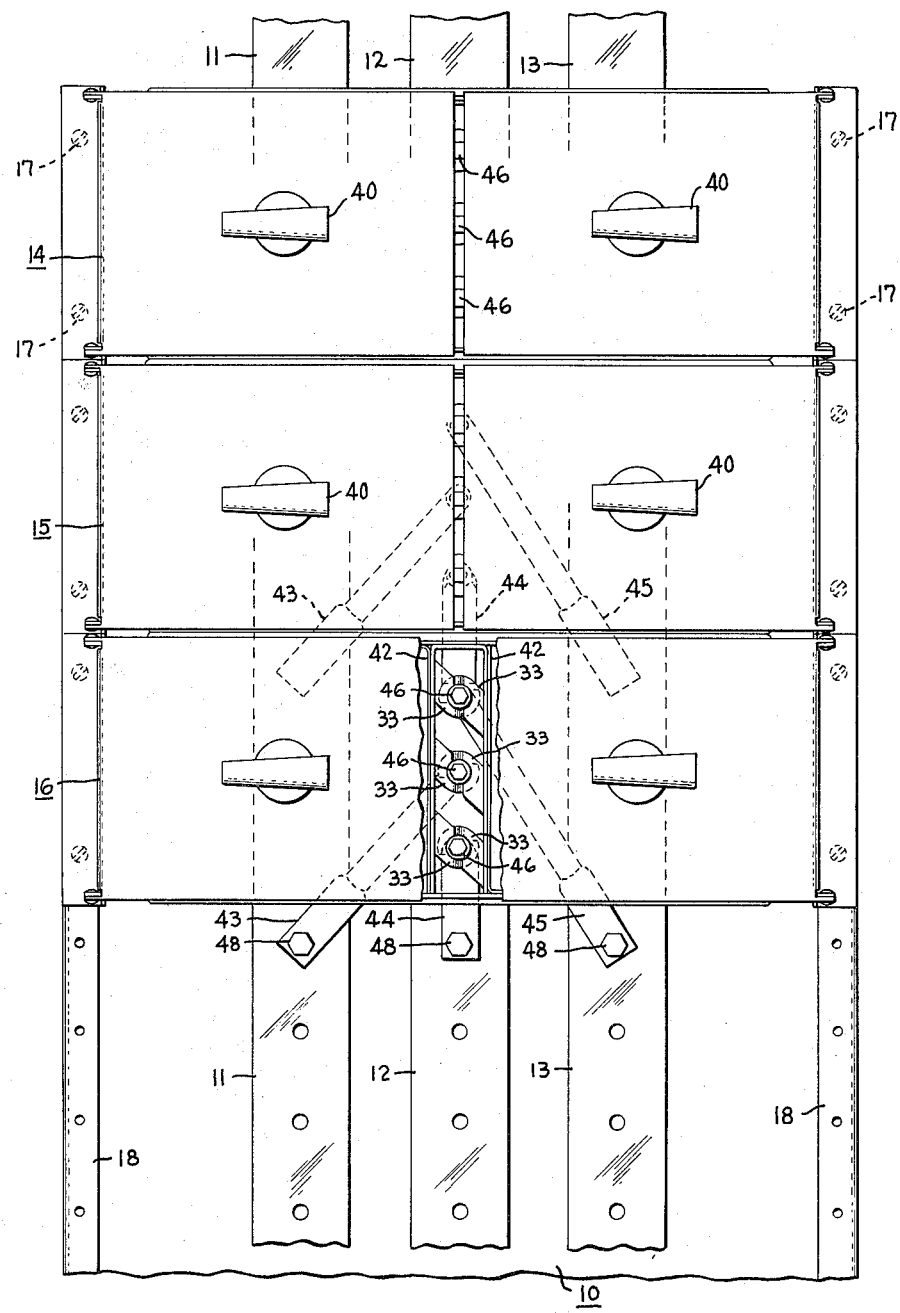
FIGURE 1 is a front elevation view of a portion of an electrical panelboard constructed in accordance with the invention.

In the drawings, the invention is shown in FIGURE 1 as incorporated in an electrical panelboard including a primary supporting member 10 which may be a vertical metallic cabinet or the like, having a plurality of electrical bus bars 11, 12, and 13 supported thereon by suitable insulating means, not shown.

A plurality of "double branch" panel units 14, 15 and 16 are shown mounted on the main support 10 by suitable means such as by screws 17 extending into flanges 18 of the support 10. (See FIGURE 2.)

Referring now to FIGURE 2, each of the panel units 14, 15 and 16 includes a box-like generally rectangular metallic enclosure preferably made up of separate pieces, fastened together. Thus the enclosure 20 includes separately fabricated opposed side walls 21 of substantially flat sheet metal, interlocked with separately fabricated opposed end walls 22. The opposed side and end walls 21 and 22, when assembled and interlocked serve to interlock with and support two partial back wall members or bases 23A and 23B. The bases 23A and 23B are spaced apart at the center of the panel unit, to provide clearance for the branch connecting straps, in a manner to be described.

The right and left hand portions of the double branch unit illustrated in FIGURE 2 are substantially identical, and therefore only one, the right hand unit, will be described. The base 23B serves to support a first insulating block 24 carrying a plurality of fuse clips 25 each having a conductor connecting means or lug 26 mounted thereon and connected thereto. Also mounted on the base 23B, in spaced apart relation to the base 24 is a three pole electric switch 27. The switch 27 includes an insulating base 28 which, along one side, carries a plurality of fuse clips 29 spaced from the fuse clips 25. The fuse clips 29 are mounted on the base 28 by means of straps 30, each of which includes an upturned portion 31 adapted to act as a stationary contact for the switch 27. Each strap 30 is mounted on the insulating base 28 by means of a screw 32.

Also mounted on the insulating base 28, at the other side thereof, are a plurality of generally hook-shaped terminal members 33, each also having an integral upturned portion 34 adapted to act as a stationary contact for the switch 27. The terminal members 33 are mounted on the insulating base 28 by means of screws 35.

The stationary contacts 31 and 34 are adapted to be interconnected when the switch 27 is moved to closed condition, by means of bridging contact members 36, each of which is resiliently carried by an elongated insulating switch rotor 37. The rotor 37 is rotatably carried by the base 28, and includes a non-circular end portion 38 which is received in an operating bracket 39 pivotally carried by the side wall 21 of the enclosure 20. Suitable operating means, not shown, which may be of conventional character, is provided for connecting the external rotary type handle 40 to each of the switches 27.

Each of the enclosures 20 includes a generally U-shaped metallic barrier 41 centrally thereof. The barrier 41 is fastened to the side walls of the enclosure by suitable means, and insulated from the adjacent switch units by sheets of insulating material 42. The barrier member 41 defines a central chamber between the two units wherein connections may be made between the terminals 23 and suitable branch connecting straps 43, 44, 45, it being understood that the insulating sheet 42 extends lower than the metallic barrier member 41, and the terminal members 33 extend below the insulating sheet 42.

As shown in FIGURES 2 and 3, each of the connectors 33 is hook-shaped, and has an outer portion 33A which is off-set from the plane of the rest of the strap 33 by a step-like bend or offset 33B. Each pair of terminal connectors 33 is thereby adapted to overlap in interlocking fashion as indicated in FIGURE 3. This permits each pair of connectors 33 to be connected or clamped to a corresponding stud portion such as the portion 44A by a single screw or clamping member 46. It will be observed that since the straps 33 are in overlapped relation in the connected position, the connecting force of the screw is applied equally to both. This would not be possible if the parts were merely in side-by-side or abutting co-planar relation. At the same time, the construction illustrated permits an overlapping connection of two endwise related straps which are identical in construction, that is, one is not the reverse of the other. This makes for lower cost and easier manufacture.

The connecting straps 43, 44, 45, are preferably formed from round metallic stock having an end portion flattened to provide strap like connecting end portions which can be readily connected to the flat strap like bus bars 11, 12 and 13 by suitable means, such as by bolts 48 (see FIGURE 1). The rod-like portions of the straps 43, 44, 45 are preferably covered with insulating tubing and include a vertically extending portion having a tapped aperture to receive the connecting bolts 46.

In accordance with the invention, the units 14, 15, and 16 are constructed with the branch connecting straps 43, 44, 45, in place and connected to the respective units by means of the screws 46. Thus, the first unit is assembled on the support 10 by placing it in position and mounting it such as by means of screws 17. The branch connecting straps 43, 44, 45, are then connected to the main bus bars 11, 12 and 13 by means of bolts 48. This can be done from the front of the panel, since the ends of the straps 43, 44, 45 project below the unit outline. (See FIGURE 1.) The second unit 15 is then assembled in close relation to the previous unit 14, and covering the ends of the branch connecting straps 43, 44, 45 of the unit 14. The unit 15 is mounted in the same way as the previous unit. This is continued until a complete row of units is assembled, the space below the last unit being covered by a suitable cover plate, not shown. Thus all units may be assembled on the panel proper from the front of the panel assembly.

If it is desired or required at some later time to remove a panel unit such as 15 from between two other units such as 14 and 16, this may readily be done simply by opening the doors of the enclosure of the unit 15 to provide access to the connecting bolts 46 within the chamber defined by the barrier 41. When these bolts are removed, the unit 15 may then be bodily removed by removing the screws 17 which hold it in place on the support 10. The branch connecting straps 43, 44, 45, of course, remain in place and are available to receive a replacement unit which may again be connected thereto from the front of the panel unit.

Also, because of the terminal arrangement disclosed, the minimum possible space is required between the end-to-end panel units, thereby reducing the overall width of the assembly to a minimum.

While the invention has been shown in only one particular form, it will be readily apparent that many modifications thereof may be made, and it is therefore intended by the appended claims to cover all such modifications as fall within the true spirit and scope of the invention.

What I claim as new and desire to secure by Letters Patent of the United States is:

1. An electric panelboard assembly comprising:
 (a) a main support,
 (b) at least two elongated electrical bus bars supported in spaced apart co-planar substantially parallel relation on said support,
 (c) a plurality of generally box-like enclosures supported on said support in superimposed relation to said bus bars and in close side-by-side relation in a row extending parallel to said bus bars,
 (d) each of said enclosures including openable cover means,
 (e) electrical control apparatus contained in each of said enclosures,
 (f) means connecting said electrical apparatus to said bus bars comprising at least one branch connecting strap for each of said bus bars,
 (g) each of said branch connecting straps having one end thereof connected to said electrical apparatus in said enclosure by means accessible through said openable cover,
 (h) each of said branch connecting straps having the other end thereof projecting beyond the outline of said enclosure and disposed and arranged to be connectable to one of said bus bars from the front of said panelboard assembly when said enclosure is in mounted position on said panelboard assembly and before the succeeding enclosure is mounted in place on said panelboard assembly,
 (i) each succeeding enclosure when in mounted relation overlying said connections between said bus bars and said branch connecting straps of the previously installed enclosure,
 (j) each of said enclosures with its control apparatus being removable from the front of said panelboard assembly by releasing said branch connecting strap connecting means accessible through said openable cover.

2. An electric panelboard assembly comprising:
 (a) a main support,
 (b) three elongated electrical bus bars supported in spaced apart substantially co-planar parallel relation on said support,
 (c) a plurality of electrical control units supported on said support in superimposed relation to said bus bars and in close side-by-side relation in a row extending parallel to said bus bars,
 (d) each of said control units comprising a generally box-like enclosure having an openable cover at the front thereof and containing electrical control apparatus therein,
 (e) electrical connecting means connecting said control apparatus of each of said units to said bus bars respectively comprising three branch connecting straps for each of said control units,
 (f) each of said connecting straps being connected to said electrical apparatus at one end within said enclosure, and having its other end projecting below the outline of said enclosure, whereby said other end of said branch connecting straps may be connected directly to said bus bars from the front of said panel without opening said covers of said units, prior to the installation of a succeeding control unit, (g) each succeeding enclosure when in mounted relation overlying said connections between said bus bars and said branch connecting straps of the previously installed enclosure, (h) said connection of said branch connecting straps to said control apparatus within said enclosure being accessible for removal through the front of said enclosure when said openable cover is open, and said branch connecting straps being separable from said control units at the back thereof, whereby each of said control units may be removed from said panelboard from the front thereof without removing said branch connecting straps from said bus bars.

3. An electric panellboard comprising:
(a) a main support,
(b) at least two electric bus bars supported on said support in spaced apart parallel relation,
(c) at least one pair of electrical control devices supported in spaced apart end-to-end alignment on said support transversely of said bus bars,
(d) each of said control devices including at least two terminals extending from one end thereof toward the other of said control devices,
(e) said terminals each comprising a generally hook-shaped member of sheet metallic material, all portions of said hook being substantially co-planar excepting that the outer end portion thereof is offset substantially the thickness of stock of said hook, the opening portions of said hook facing in a direction substantially parallel to the direction of said bus bars,
(f) a branch connecting strap connected to each of said bus bars and having a connecting end portion disposed in the space between said control devices,
(g) each of said terminals of each of said devices being in mutually overlapped and interlocked relation with a corresponding terminal of the other of said devices and each of said pairs of overlapped and interlocked terminals being connected to a single one of said connecting end portions of said branch connecting straps by a single connecting device.

4. Electrical apparatus comprising:
(a) a support,
(b) at least one stationary terminal supported on said support,
(c) at least two electrical devices supported on said support in end-to-end spaced apart relation, said stationary terminal being supported in the space between said devices,
(d) each of said devices including at least one terminal member extending towards said stationary terminal,
(e) each of said terminal members of said devices comprising a generally hook-shaped member of sheet metallic material, the outer portion of said hook being offset out of the plane of the inner portion substantially the thickness of stock of said hook,
(f) said terminal members being mutually overlapped,
(g) said stationary terminal member including a clamping member in screw-threaded engagement clamping said overlapped terminal portions to each other and to said stationary terminal member.

5. An electric apparatus assembly comprising:
(a) a support,
(b) at least one stationary terminal supported on said support,
(c) at least two electrical devices supported in end-to-end relation on said support in end-to-end spaced apart relation, said stationary terminal being supported in the space between said devices,
(d) each of said devices including at least one terminal strap extending one end thereof toward said stationary terminal,
(e) said terminal straps each comprising a sheet metallic hook member, the outer portion of said hook member being offset substantially the thickness of stock of said hook, the opening portion of said hook facing in a direction substantially at right angles to an imaginary line representing the shortest distance between said spaced ends of said devices,
(f) said stationary terminal having a clamping member in threaded relation thereto,
(g) said hook portions of said terminal straps extending in mutually overlapped relation with said hook portions partially surrounding said clamping member and said overlapped hook portions being clamped together and to said stationary terminal member by said clamping member.

6. An electric panelboard comprising:
(a) a main support,
(b) at least two elongated electrical bus bars supported on said support in spaced apart parallel relation,
(c) at least two electrical control devices,
(d) enclosure means enclosing and supporting said control devices in spaced apart end-to-end alignment transversely of said bus bars,
(e) each of said devices having at least two terminal portions projecting therefrom, the terminal portions of both of said devices extending from their adjacent ends toward each other, and including terminal end portions disposed adjacent each other in pairs,
(f) a plurality of branch connecting straps, each of said straps extending from one of said bus bars to a position near said adjacent ends of one of said pairs of terminal portions,
(g) a plurality of screw type single connecting means, each of said single connecting means serving to connect a pair of said terminal end portions to one of said branch connecting straps,
(h) said plurality of screw type single connecting means being disposed generally in alignment in a row substantially parallel to said bus bars,
(i) a pair of barrier members disposed at either side of said row of connecting means and between said connecting means and said electrical control devices and defining a connection chamber intermediate said control devices, and
(j) said branch connecting straps each comprising an elongated rod-like conductor having one end portion extending upwardly under a pair of said terminal end portions and having an axial tapped hole therein to receive a clamping screw, and the other end of said connecting strap comprising a flattened portion having an aperture therein and adapted to be connected to one of said bus bars.

References Cited by the Examiner

UNITED STATES PATENTS

| 2,059,987 | 11/36 | Frank et al. | 174—72 X |
| 2,103,325 | 12/37 | Frank et al. | 317—117 |
| 2,339,496 | 1/44 | Madiera | 174—52 X |
| 2,766,405 | 10/56 | Edmunds | 317—119 |
| 2,958,070 | 10/60 | Brewer et al. | 339—198 |
| 3,060,349 | 10/62 | Brady et al. | 317—118 X |
| 3,148,312 | 9/64 | Fouse | 174—99 X |

FOREIGN PATENTS 73,423  11/51  Denmark.

JOHN F. BURNS, *Primary Examiner.*

JOHN P. WILDMAN, E. JAMES SAX, *Examiners.*